United States Patent [19]

Machida

[11] Patent Number: 4,606,511
[45] Date of Patent: Aug. 19, 1986

[54] TAPE REEL

[75] Inventor: Kazutoshi Machida, Odawara, Japan

[73] Assignee: Fuji Photo Film Co., Ltd., Tokyo, Japan

[21] Appl. No.: 760,278

[22] Filed: Jul. 29, 1985

[30] Foreign Application Priority Data

Aug. 17, 1984 [JP] Japan .......................... 59-125201[U]

[51] Int. Cl.$^4$ ........................................... B65H 75/14
[52] U.S. Cl. ..................................... 242/71.8; 242/199
[58] Field of Search ..................... 242/71.8, 116, 117, 242/77.3, 118.4, 118.6, 118.61, 118.62, 118.8, 197-200

[56] References Cited

U.S. PATENT DOCUMENTS 4,234,137 11/1980 Watanabe et al. ................. 242/71.8
4,452,404 6/1984 Gelardi et al. ..................... 242/71.8
4,520,969 6/1985 Wulfing et al. .................... 242/71.8
4,523,727 6/1985 Morioka ......................... 242/71.8 X Primary Examiner—John M. Jillions
Attorney, Agent, or Firm—Pasquale A. Razzano

[57] ABSTRACT

Double injection molding is used to form a tape reel of two different resins. One of the resins, which is harder-wearing and more expensive than the other, is used to form a projecting portion which, being subjected to constant pressure by a spring, is required to have good wear-resistance. The other resin is a cheaper, general-purpose type, and is used to form the other parts of the reel. By making it possible to use double injection molding to form the different parts of the reel simultaneously, the reel has few parts and assembly entails few operations, and will enable the material costs of the reel to be reduced.

6 Claims, 13 Drawing Figures

TAPE REEL

BACKGROUND OF THE INVENTION

1. Field of the Invention

This invention relates to the tape reel of a magnetic recording tape cassette used for the recording and read-out of image information and the like. More particularly, this invention relates to double injection molding of an inexpensive tape reel using two types of resin.

2. Description of the Prior Art

As shown by the cutaway drawing of FIG. 10 and the longitudinal cross-section view of FIG. 11, a magnetic tape recording cassette consists of an upper case 1 and lower case 2, each of which is a flat, rectangular parallelopiped, and which are fixed together, with two reels 3, 4 rotatably housed therein. Conventionally the reel has consisted of an upper flange 5 formed from clear AS resin, and a reel lower portion 12 consisting of a hub 6, shaft hole wall 7, shaft hole bottom wall 8, connecting ribs 9, lower flange 10 and protruding shaft 11 integrally formed of wear-resistant POM resin, the upper flange 5 being affixed to the shaft hole bottom wall 8 on the opposite side to the shaft hole 13 formed by the shaft hole wall 7 and the shaft hole bottom wall 8. The protruding shaft 11 is in constant contact with a metal, strip-shaped reel restraining spring 14 which presses on the protruding shaft 11 with a force of 100-200 g when the cassette has been loaded into the recording/read-out apparatus, and it is because during the course of recording or read-out using the entire length of the tape the reels rotate some 1,500 times that the protruding shaft 11 is made from wear-resistant POM resin.

Because the protruding shaft 11 is made of POM resin, the same resin must be used for the entire reel lower portion 12 which is formed integrally with said protruding shaft 11; the cost of POM resin being high compared with a general-purpose resin such as ABS resin or the like, this has tended to increase the cost of the reels. In an attempt to solve this problem, there has been proposed a method whereby POM resin is used to form only the protruding shaft 11, with the other parts of the reel lower portion 12 being formed of ABS resin, and the protruding shaft 11 is affixed between the upper flange 5 and the shaft hole bottom wall 8 formed integrally with the reel lower portion 12. However, the problem with this method was that it involved more parts and more assembly operations, so it did not result in a cost reduction.

SUMMARY OF THE INVENTION

It is therefore an object of this invention to provide an inexpensive tape reel which has few parts and is easy to assemble, and which has a protruding shaft with good wear-resistance.

The tape reel according to the present invention comprises a reel lower portion consisting of a hub about which the magnetic recording tape is wound, a shaft hole wall which forms a shaft hole open at one end for communicating turning force to the hub, a plurality of connecting ribs which connect the hub to the outer surface of the shaft hole wall, and a lower flange which supports the magnetic recording tape wound on the hub, integrally formed of a resin which differs from the resin from which is formed on the surface of the end of the shaft hole opposite to the open end a shaft hole bottom wall having at its center a protruding shaft, said reel lower portion and shaft hole bottom wall of different resins forming an integral two-colors whole, with preferably the resin from which the shaft hole bottom wall is formed possessing good wear-resistance.

According to this invention, costly, highly wear-resistant resin is used only for the shaft hole bottom wall forming the protruding shaft, with inexpensive resin being used for the other portions, in addition to which double injection molding is used, enabling the two portions to be integrally formed substantially simultaneously, providing a cheap tape reel which requires few parts and assembly operations.

DETAILED DESCRIPTION OF THE INVENTION

Figure 1:
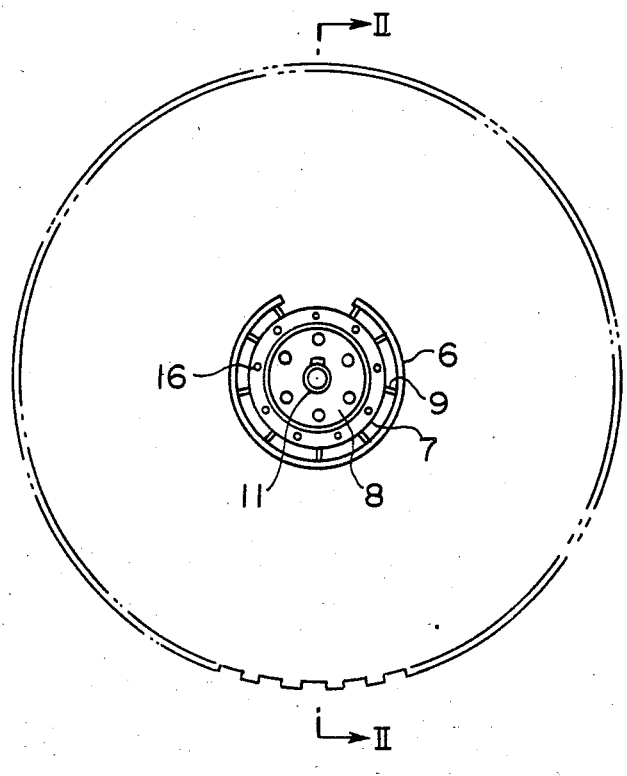
FIG. 1 is a plan view of one embodiment of the tape reel according to the present invention.
Figure 2:
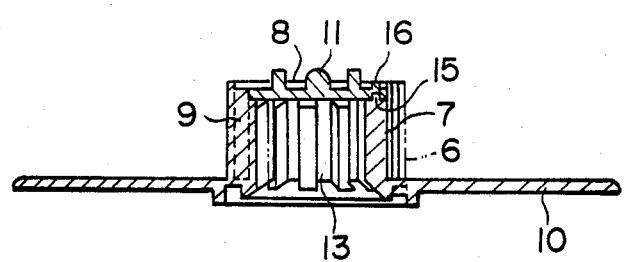
FIG. 2 is a cross-sectional view through the line II-II of FIG. 1.
Figure 10:
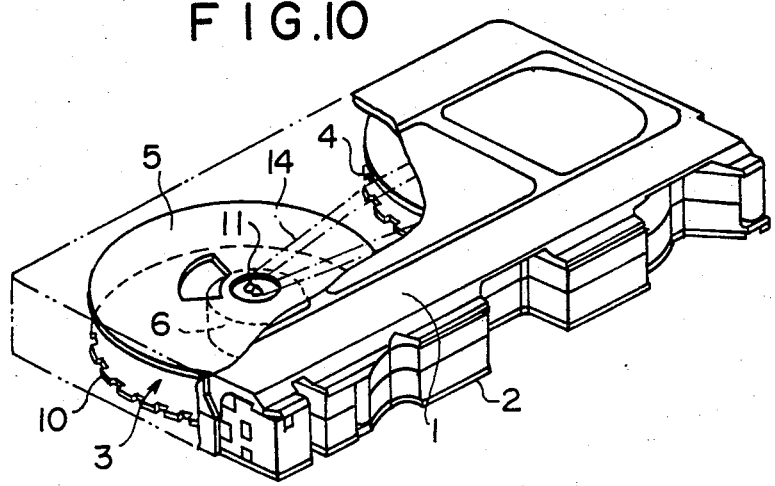
FIG. 10 is a partially cutaway perspective view of a conventional magnetic recording tape cassette.
Figure 11:
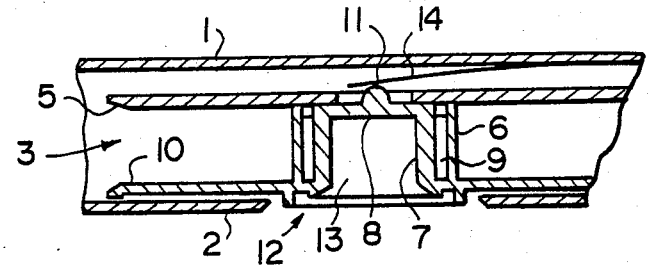
FIG. 11 shows a longitudinal cross-section of part of the tape cassette of FIG. 10.

In FIGS. 1, 2 and 10, like numbers denote like parts. With reference to these drawings, an ABS resin molded portion formed integrally out of ABS resin comprises a circular lower flange 10, a cylindrical reel hub 6 concentrically formed on one surface of the lower flange 10, a cylindrical shaft hole wall 7 formed concentrically on the inner diameter side of the reel hub 6, and a plurality of radially-provided connecting ribs 9 which connect the hub 6 with the shaft hole wall 7; a round shaft hole bottom wall 8 provided concentrically with the shaft hole wall at the closed end thereof and which has formed at its center a protruding shaft 11, forms the POM resin molded portion, being made from POM resin. A plurality of joining projections 15 are formed in the end surface of the shaft hole wall 7 which abuts the shaft hole bottom wall 8. In the process of the integral double injection molding of the shaft hole wall 7 and the shaft hole bottom wall 8, the mold structure is such that unrequired raised portions 16 are unavoidably formed in the surface of the outer portion of the shaft hole bottom wall at positions corresponding to the positions of the joining projections 15.

Figure 3A:
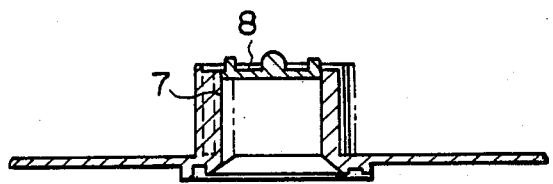
FIGS. 3(a) and 3(b) are longitudinal cross-section views showing an example of part of an interface between a portion formed of ABS resin and a portion formed of POM resin.
Figure 3B:
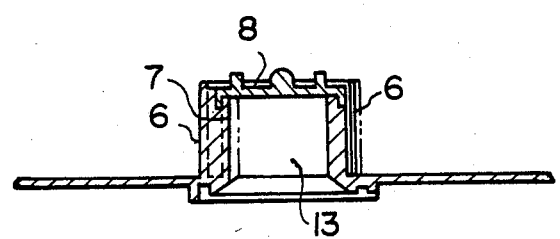

As shown in FIG. 3(a), if with respect to the interface between the ABS resin molded portion and the POM resin molded portion the outside diameter of shaft hole bottom wall 8 is the same as the inside diameter of shaft hole wall 7, it becomes impossible to provide the effective joining projections and the two resins cannot therefore be joined adequately, so there is a possibility that the protruding shaft will come away from the interface if the protruding shaft is subjected to a shock. If, as shown by FIG. 3(b), the interfacing surfaces of the two resin-molded portions are formed as the outer or inner peripheral surface of the shaft hole wall 7, differences in the shrinkage factor of the two resins produce differences in the diameter of the shaft hole 13, which can facilitate deformation in the hub 6 which locates on the outer periphery thereof. For these reasons, in the interfacial surface of the present embodiment, as shown in FIG. 2, the entire end surface of the shaft hole wall 7 is formed into joining projections 15.

Figure 4A:
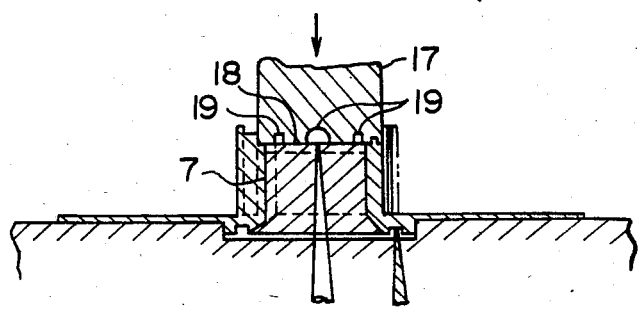
FIGS. 4(a) and 4(b) are longitudinal cross-section views showing the forming method used in the embodiment.
Figure 4B:
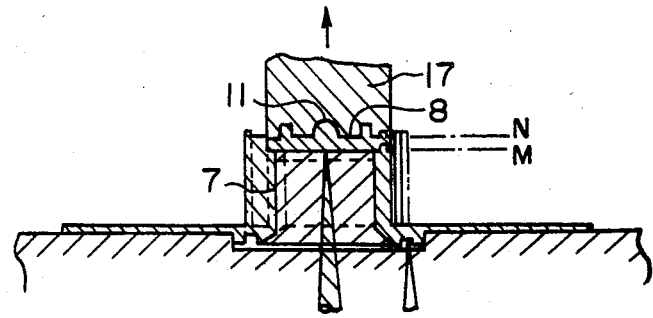

The method of forming the tape reel thus constructed will now be explained. With reference to FIG. 4(a), a sliding core 17 is brought down to first make the reel lower portion from ABS resin, except for the protruding shaft 11 and the shaft hole bottom wall 8. Next, the sliding core 17 is retracted from position M to position N (FIG. 4(b)) and the protruding shaft 11 and shaft wall bottom hole 8 formed from POM resin. When the sliding core 17 is brought down, the end surface 18 of the fixed side of the molding which forms the inner surface of the shaft hole wall 7 is in close contact with the end surface of the sliding core 17, therefore there is no inflow of resin into the space 19.

In case of the double injection molding of a number of items, because symmetrical arrangement of the cavities, looking from the molten resin inlet, is impossible, the cold runner method cannot be employed owing to the difference in pass lengths. Because of restrictions on the shape of the reel lower portion, the gate position is fairly limited. With reference to FIG. 4, for example, the gate for forming the protruding shaft 11 and the shaft hole bottom wall 8 comes fairly close to the gate for forming the other portions of the reel lower portion, so the hot runner method cannot be employed, because it requires considerable space. For the above reasons, a semi hot runner method was employed for the present embodiment.

Figure 5:
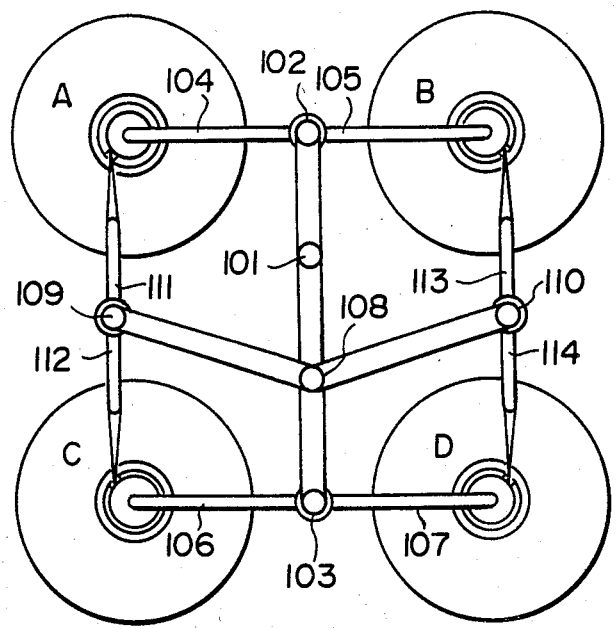
FIG. 5 is a perspective view of the fixed side of the mold used for the embodiment, seen from the face having the locating ring.
Figure 6:
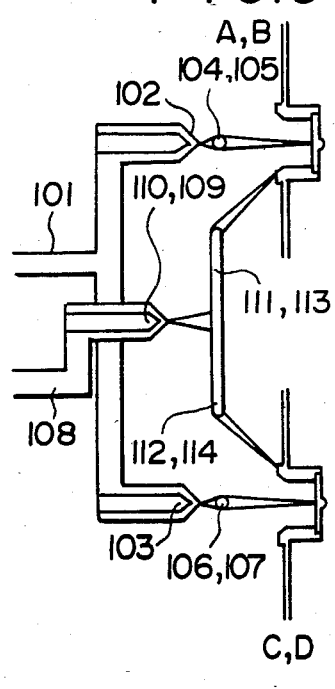
FIG. 6 is a front view of the mold of FIG. 5.
Figure 7:
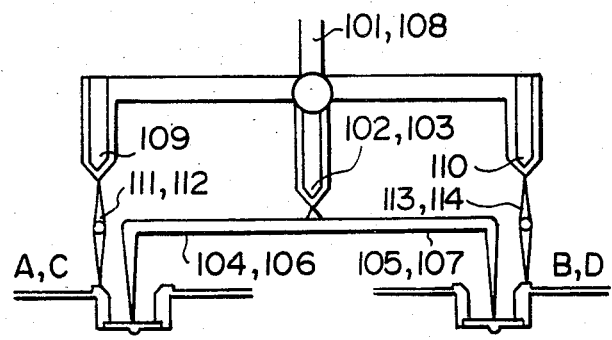
FIG. 7 is a side view of the molding of FIG. 5.

The construction of the four-off mold employing the semi hot runner method will now be described with reference to FIGS. 5, 6 and 7. In the figures, 101 is a POM resin inlet for the formation of the protruding shaft 11 and the shaft hole bottom wall 8. The inlet 101 is located non-symmetrically with reference to the four reel lower portion cavities A, B, C and D. The resin entering the inlet 101 is divided, vertically in the drawings, to flow to hot runner gates 102 and 103. The runners between the inlet 101 and the gates 102 and 103 are kept constantly charged with molten resin. The resin which comes out of the gate 102, flows to the left and right, in the drawing, via cold runners 104 and 105 to the protruding shaft 11 and shaft hole bottom wall 8 parts of the respective cavities A and B. In the same way, the resin which comes out of the gate 103 flows via the cold runners 106 and 107 to the protruding shaft 11 and shaft hole bottom wall 8 parts of the respective cavities C and D. As cold runners 104, 105, 106 and 107 are all of the same length, if gates 102 and 103 are operated at the same time, it is possible to form simultaneously the protruding shaft 11 and shaft hole bottom wall 8 in cavities A, B, C and D.

The numeral 108 denotes the inlet for the ABS resin for the integral forming of the hub 6, shaft hole wall 7, connecting ribs 9 and lower flange 10. This inlet 108 is also positioned non-symmetrically with respect to the four reel lower portion cavities A, B, C and D. The resin from the inlet 108 flows to the right and left, in the drawing, to the hot runner gates 109 and 110. The space between the inlet 108 and the gates 109 and 110 is kept constantly charged with molten resin. The resin coming from the gate 109 is separated vertically, in the drawing, into streams which go via cold runners 111 and 112 to the portions of the reel lower portion, other than said protruding shaft 11 and shaft hole bottom wall 8 in cavities A and C, respectively. In the same way, the resin coming from the gate 110 is divided into streams which go via cold runners 113 and 114 to cavities B and D, respectively, to the parts of the reel lower portion other than the protruding shaft 11 and the shaft hole lower wall 8. As the cold runners 111, 112, 113 and 114 are all of the same length, if the gates 109 and 110 are operated at the same time, it is possible to form the parts of the reel lower portion other than the protruding shaft 11 and shaft hole bottom wall 8 simultaneously in the cavities A, B, C and D.

Following the forming, the cold runners formed at the same time as the reel lower portion are removed using any generally known method. The cold runners can be recycled so as to avoid any waste.

With a mold having the above construction, multiple item formation becomes possible using double injection molding in which cavity point-to-point symmetrical layout, viewed from the resin inlet, is not possible.

In the above-described embodiment four items are formed, but the number of formed items is not limited to four.

Figure 8:
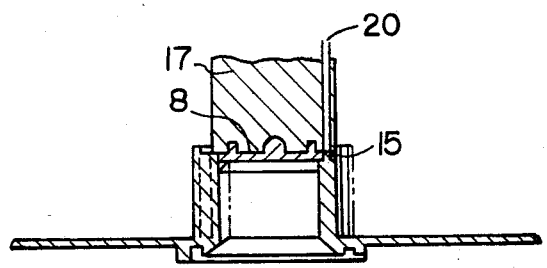
FIG. 8 and FIG. 9 are longitudinal cross-sectional views of other embodiments according to the present invention.
Figure 9:
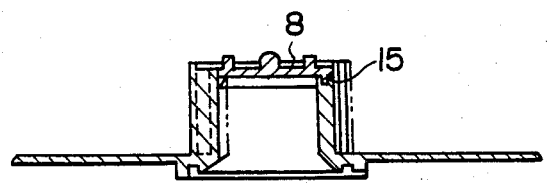

Other embodiments of the tape reel according to the present invention are illustrated in FIGS. 8 and 9. Whereas in the first embodiment the sliding core 17 was provided with blind holes to form the joining projections 15 in the top edge of the shaft hole wall 7, in the embodiment as shown in FIG. 8, the holes in the sliding core 17 used to form said joining projections 15 are through holes, and in accordance with the thickness of the shaft hole bottom wall 8, pipes 20 are inserted and fixed so the height of the joining projections 15 is approximately the same as the thickness of the shaft hole bottom wall 8.

In the embodiment illustrated in FIGS. 8 and 9 the joining projections 15 are provided on the shaft hole bottom wall 8.

The shape of the joining projections is not limited to that described in the above embodiments, but may be any shape.

As the above-described double injection molded tape reel has become practicable, it makes it possible to select resins on the basis of reel function and to reduce the material costs of the tape reel.

I claim:

1. A magnetic recording cassette tape reel comprising a reel lower portion consisting of a hub about which magnetic recording tape is reeled, a shaft hole wall and shaft hole bottom wall which form a shaft hole open at one end for communicating turning force to said hub, a protruding shaft formed concentrically on the side of the shaft hole bottom wall opposite to the shaft hole and which forms a contact point during the rotation of the reel, a plurality of connecting ribs which connect the hub to the outer surface of the shaft hole wall, said shaft hole wall having an upper end opposite said shaft hole including an inner generally annular shoulder, said shaft hole bottom wall having a peripheral edge seated on said shoulder of the shaft hole wall; a lower flange which supports the reeled magnetic recording tape, and which is also provided with an upper flange which is fixed to the reel lower portion to prevent mis-reeling of said magnetic recording tape, said upper end of said shaft hole wall also including a plurality of joining projections extending upwardly therefrom adjacent said shoulder into the shaft hole bottom wall, said reel being integrally and simultaneously double injection molded of different resins, with said shaft hole bottom wall and said protruding shaft being molded of a more wear resistant resin than the reel portion consisting of said reel hub, shaft hole wall, connecting ribs, lower flange, and projections, whereby said projections prevent deformation of the hub resulting from the mold shrinkage of the two different resins.

2. A tape reel as claimed in claim 1 wherein said shaft hole bottom wall which forms said protruding shaft is formed of wear-resistant POM resin and said reel hub, shaft hole wall, connecting ribs projections, and lower flange are formed of ABS resin.

3. The magnetic recording cassette tape reel according to claim 2 wherein said shaft hole bottom wall includes an inside and outside diameter and said shaft hole wall includes an inside and outside diameter, said projections preventing the protruding shaft when it is subjected to a shock from disengaging from the interface created by the ABS resin molded portion and the POM resin molded portion when the outside diameter of the shaft hole bottom wall is the same as the inside diameter of the shaft hole wall.

4. A magnetic recording cassette tape reel comprising a reel lower portion consisting of a hub about which magnetic recording tape is reeled, a shaft hole wall and shaft hole bottom wall which form a shaft hole open at one end for communicating turning force to said hub, a protruding shaft formed concentrically on the side of the shaft hole bottom wall opposite to the shaft hole and which forms a contact point during the rotation of the reel, a plurality of connecting ribs which connect the hub to the outer surface of the shaft hole wall, said shaft hole wall having an upper end opposite said shaft hole including an inner generally annular shoulder, said shaft hole bottom wall having a peripheral edge seated on said shoulder of the shaft hole wall; a lower flange which supports the reeled magnetic recording tape, and which is also provided with an upper flange which is fixed to the reel lower portion to prevent mis-reeling of said magnetic recorder tape, said peripheral edge of said shaft hole bottom wall also including a plurality of joining projections extending downwardly therefrom adjacent said shoulder into the shaft hole wall, said reel being integrally and simultaneously double injected molded of differenet resins, with said shaft hole bottom wall, said protruding shaft, and said projections being molded of a more wear resistant resin than the reel portion consisting of said reel hub, shaft hole wall, connecting ribs, and lower flange, whereby said projections prevent deformation of the hub resulting from the mold shrinkage of the two different resins.

5. The magnetic recording cassette tape reel according to claim 4 wherein said shaft hole bottom wall which forms said protruding shaft and said projections are formed of wear-resistant POM resin and said reel hub, shaft hole wall, connecting ribs and lower flange are formed of ABS resin.

6. The magnetic recording cassette tape reel according to claim 5 wherein said shaft hole bottom wall includes an inside and outside diameter and said shaft hole wall includes an inside and outside diameter, said projections preventing the protruding shaft when it is subjected to a shock from disengaging from the interface created by the ABS resin moled portion and the POM resin molded portion when the outside diameter of the shaft hole bottom wall is the same as the inside diameter of the shaft hole wall.

* * * * *